United States Patent
Gorinevsky et al.

[11] Patent Number: 6,086,237
[45] Date of Patent: Jul. 11, 2000

[54] AUTOMATED IDENTIFICATION OF WEB SHRINKAGE AND ALIGNMENT PARAMETERS IN SHEET MAKING MACHINERY USING A MODELED ACTUATOR RESPONSE PROFILE

[75] Inventors: Dimitry M. Gorinevsky, Burnaby; Edwin Michael Gyde Heaven, North Vancouver, both of Canada

[73] Assignee: Measurex Devron Inc., North Vancouver, Canada

[21] Appl. No.: 08/735,073

[22] Filed: Oct. 18, 1996

Related U.S. Application Data
[60] Provisional application No. 60/005,715, Oct. 20, 1995.

[51] Int. Cl.$^7$ .............................. G06F 19/00; G06G 7/64; G06G 7/66
[52] U.S. Cl. ................................. 364/471.01; 364/471.02; 364/471.03; 364/470.1
[58] Field of Search ..................................... 364/159, 158, 364/160, 471.03, 471.01, 471.02, 472.06, 471.1, 472.12, 472.13, 572, 551.01, 470.1; 73/159; 162/162, 197, 198, 202, 203, 252, 253; 250/559.48, 557

[56] References Cited
U.S. PATENT DOCUMENTS

| | | | |
|---|---|---|---|
| 5,099,118 | 3/1992 | Francis | 250/308 |
| 5,400,258 | 3/1995 | He | 364/471 |
| 5,539,634 | 7/1996 | He | 364/158 |
| 5,552,021 | 9/1996 | Ilvespaa et al. | 162/263 |
| 5,603,806 | 2/1997 | Kerttula | 162/198 |
| 5,636,126 | 6/1997 | Heaven et al. | 364/471.03 |
| 5,649,448 | 7/1997 | Koskimies et al. | 73/159 |
| 5,658,432 | 8/1997 | Heaven et al. | 162/198 |
| 5,685,955 | 11/1997 | Leigraf et al. | 162/198 |
| 5,691,908 | 11/1997 | Adamy | 364/469 |

OTHER PUBLICATIONS
Dimitry Gorinevsky, Michael Heaven et al, Measurex Devron Inc., Automated Identification of Web Shrinkage and Alignment in Paper and Film Machines, IEEE Int. Conf. on Systems Man and Cybernetics, Oct. 1995, Vancouver, B.C., pp. 1–6.

*Primary Examiner*—William Grant
*Assistant Examiner*—Ramesh Patel
*Attorney, Agent, or Firm*—Christie, Parker & Hale, LLP

[57] ABSTRACT

A process for determining shrinkage and alignment of the web in a sheetmaking machine having a plurality of actuators for controlling web parameters in the cross-direction. The process involves the steps of applying excitation to the actuators, collecting data regarding the change in cross-direction web properties due to the excitation of the actuators to determine a measured actuator response profile. A modeled actuator response profile is established and a best fit of the modeled actuator response profile to the measured actuator response profile is established to allow for determination of alignment and shrinkage parameters of the web based on the best fit modeled actuator response profile. The foregoing approach permits reliable identification of alignment and shrinkage within 10–20 data scans of the web, despite process noise, with improved accuracy when compared with conventional "bump" tests.

11 Claims, 10 Drawing Sheets

AUTOMATED IDENTIFICATION OF WEB SHRINKAGE AND ALIGNMENT PARAMETERS IN SHEET MAKING MACHINERY USING A MODELED ACTUATOR RESPONSE PROFILE

This application claims the benefit of U.S. Provisional Application No. 60/005,715, filed Oct. 20, 1995.

FIELD OF THE INVENTION

This invention relates to control of a sheet making process, and more particularly to a method for determining sheet shrinkage and alignment.

BACKGROUND OF THE INVENTION

Conventional sheet making machinery for producing a continuous web or sheet of material includes equipment to set the sheet properties of the web as it is being manufactured. Generally, on-line measurements of sheet properties are made by scanning sensors that travel back and forth across the width of the sheet of material in the cross-machine direction (CD). The machine direction (MD) is the direction of travel of sheet. The scanning sensors are located downstream of actuators that are controlled to adjust the sheet properties. The scanning sensors collect information about the sheet properties to develop a property profile across the sheet and provide control signals to the appropriate actuators to adjust the profile toward a desired target profile in a feedback loop. In practice, the actuators provide generally independent adjustment at adjacent cross-directional locations of the sheet, normally referred to as slices.

High performance cross-directional (CD) control of sheet making machines, particularly, paper machines, requires accurate knowledge of the controlled process model. Particularly important for CD control is an accurate knowledge of the mapping between CD actuators and their response centre positions in the measurement scan. Mapping involves establishing the relationship between each downstream slice where scanning measurements occur and the corresponding upstream actuator that must be adjusted to control the particular downstream slice. In practice, this mapping depends on the paper alignment and shrinkage which varies from one paper machine to another and with time for the same machine.

Alignment

The general problem of the CD response identification can be subdivided into the problems of identifying shapes of the actuator responses and determining alignment. The alignment problem could be considered as a problem of determining a distribution of the actuator response centres.

In the paper making industry, the distribution of the actuator response centres is jointly defined by the following factors:

1. Geometrical alignment of the CD actuators and scanner.
2. Position of the individual actuators within the CD actuator array.
3. Wandering of the paper web.
4. Paper shrinkage characteristics.

The first two items could be, in principle, determined from an accurate measurement of geometrical parameters of a paper machine. The last two, however, can change with the time and different paper grade and need to be experimentally identified in each case. The paper web wandering can be determined by using additional sensors and monitoring the physical edges of the sheet at the actuator and scanner locations. On the other hand, the paper shrinkage is a complicated phenomenon depending on the paper furnish, drying process and many other factors.

A conventional method for measurement of the paper shrinkage is to do a dye test, by inserting dye into the paper at the actuators and recording where the dye falls at the scanner. Dye tests are very lengthy and tiresome procedures requiring considerable manual labor.

The most suitable technique is believed to be identification of the alignment by exciting actuators (input) and observing experimental response (output). Such an input/output approach by design identifies a final result of the joint action of all factors influencing the alignment. The input/output identification technique is the most adequate for the subsequent CD controller design, since the same type of data (high resolution profile) is used for determining alignment as the data used to evaluate performance of the operating control system and to design CD control strategies. Another advantage of the input/output identification of the alignment is that it can be automated with a control computer which alleviates the need for the operator intervention, and facilitates a more regular tuning of the control system.

An approach to the input/output identification of the alignment which is commonly used in practice is to perform "actuator bump tests" by disturbing selected actuators and detecting their response by averaging many scans of the paper properties. The response centres can be then determined through the maximal response amplitudes. Knowledge of the response centre distribution allows one to determine the average shrinkages between the bumped actuators. However, the described traditional approach has a few deficiencies, the most serious of them being an unacceptable poorer paper quality produced as a result of each session, lack of reliability, and poor noise rejection.

Shrinkage

In many cases, the paper shrinkage is linear, i.e. uniform across the sheet. In that case, a combined effect of the shrinkage and alignment factors is defined by just two parameters of an affine transformation between the actuator number and the response centre position.

Theoretically, for a general nonlinear nonuniform shrinkage, a position of each response centre should be defined individually. This would require using as many parameters as there are actuators.

Practically, the paper shrinkage is defined by a shrinkage profile which is a smooth function. Most of the shrinkage appears in the dryer section. Typically, nonuniform shrinkage is caused by the nonuniform restraint of the paper in the dryer felts. The restraint is weaker at the edges, hence, the shrinkage is higher at the edges. Generally, shrinkage is roughly constant in the middle of the paper sheet and increases at the edges. Variations of shrinkage in the middle appear to be caused by shrinkage measurement error. Therefore, the algorithm developed for the process of this invention is based on the assumption that the shrinkage profile has a standard shape. The shrinkage is assumed to be constant in the middle and growing at the edges. The edge shrinkage is described by the edge zone width and the maximal shrinkage at the edge.

Based on the above discussion, an advanced shrinkage identification system should satisfy the following requirements:

1. The system should provide for a reliable automated identification of the paper alignment and shrinkage parameters, based on the results of specially designed bump tests.

2. The system should be able to work for an actuator excitation pattern of a general type that is not limited to the typical bump test pattern. This would make it possible to extend the approach for on-line use.
3. The alignment identification should be insensitive, robust to the mismatch of the bump response model.
4. The identification should be reliable despite a possible high level noise in the data.
5. The identification should require data for a small number of the scans, ideally 10 to 20. This would speed up the data collection process and reduce the amount of the product scrapped as a result of the identification tests.
6. Two versions of the algorithm need to be developed. The first, simpler version, should be applicable in the case of a linear (uniform) shrinkage. Based on practical experience, such simpler version of the alignment algorithm is sufficient in 80–90% of all cases. The second, more advanced version should allow for the identification of a nonlinear shrinkage profile.
7. The shrinkage profile should be determined as a smooth function of the CD coordinate: any rapid variation of the shrinkage in the CD is likely caused by the identification error.
8. The shrinkage identification should be maximally automated and easy to use. It should require as little operator input as possible.

SUMMARY OF THE INVENTION

In order to address the deficiencies of prior art identification processes and to achieve the design objectives stated above, applicant has developed a process for efficient identification of alignment and shrinkage profiles in sheet making machinery dubbed ASPIDS (Advanced Shrinkage Profile IDentification System). Using the process of the present invention, it is possible to identify the mapping between the CD actuators and scanned profiles of the sheet properties using advanced optimization and fuzzy logic technology. ASPIDS determines alignment by fitting a model of the response to the test data.

Accordingly, the present invention provides a process for determining shrinkage and alignment of the web in a sheet making machine having a plurality of actuators for controlling web parameters in the cross-direction comprising the steps of:

applying excitation to the actuators;

collecting data regarding the change in cross-direction web properties due to the excitation of the actuators to determine a measured actuator response profile;

establishing a modeled actuator response profile;

applying a fit of the modeled actuator response profile to the measured actuator response profile; and determining alignment and shrinkage parameters of the web based on the best fit modeled actuator response profile.

ASPIDS is capable of reliable fast identification of alignment and shrinkage profile parameters despite the measurement and process noise. It requires only 10–20 scans of the data to determine alignment and, possible, the non-linear shrinkage profile. Instead of averaging only in the machine direction, ASPIDS computes model fit error for the entire array of data and effectively averages out the noise both in the machine direction and the cross direction which results in much better noise rejection, improved accuracy, and much shorter required test intervals than conventional "bump test" methods. The process of the present invention, based on the best model fit, is applicable for any pattern of actuator excitation, not just classical "bump test" data. This fact has two implications. First, it becomes possible to apply a more dense excitation pattern on the sheet edges in order to detect nonlinear shrinkage. Second, this technique can be extended to allow for a use of the system operation data. It is believed that, in a more advanced form, algorithms developed for ASPIDS could be used for on-line monitoring and identification of paper alignment based on the closed-loop actuator moves and scanner data.

BRIEF DESCRIPTION OF THE DRAWINGS

Aspects of the present invention are illustrated, merely by way of example, in the accompanying drawings in which:

FIG. 4 shows the response shape of FIG. 3 and variation of the response shape with the attenuation parameter a.

DESCRIPTION OF THE PREFERRED EMBODIMENTS

Figure 1:
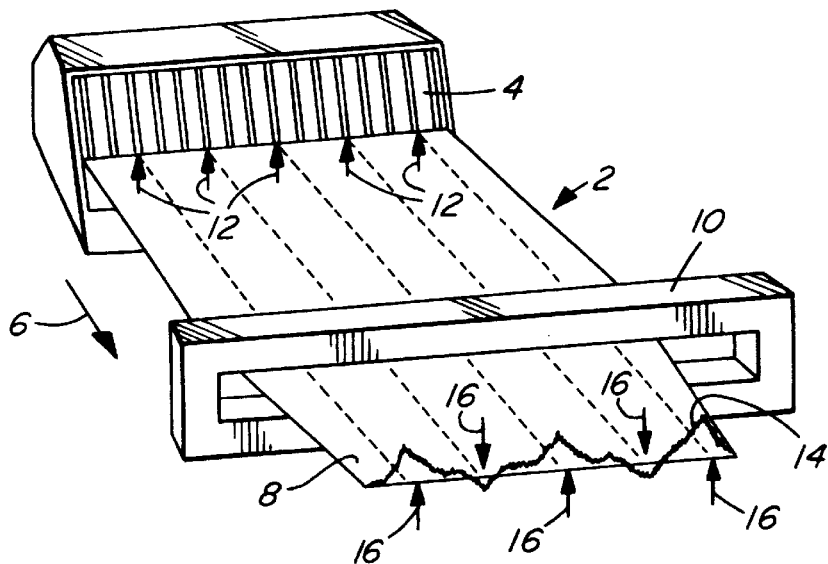
FIG. 1 is a schematic view of a sheet making machine showing the manner in which the actuators are excited to generate a response pattern in the sheet.

Referring to FIG. 1, there is shown a schematic view of a sheet making machine with a plurality of actuators 4 extending in the cross direction across a sheet 8 of material being formed. Sheet 8 is moving in the machine direction indicated by arrow 6. Actuators 4 control sheet parameters in the cross direction. A scanning device 10 is located downstream from the actuators and measures the properties of the sheet. In a conventional "bump test", a number of the actuators 4 are displaced as indicated by arrows 12 and the resulting response in the sheet is measured at scanner 10 as indicated by the scanner profile 14. By averaging many scans of the sheet, the peaks of profile 14 indicated by arrows 16 can be determined which represent the response centres of the displaced actuators and it is possible to map the actuators and their response centre positions in the measurement scan. The described traditional approach, however, results in poor paper quality produced during the test session and lack of reliability.

In the process of the present invention, actuators are also excited to generate measured responses in the cross-direction of the sheet as before, however, alignment and shrinkage parameters of the sheet are determined by using algorithms to fit a model of the response to the measured response. This approach, based on the best model fit, is applicable for any pattern of actuator excitation, not just to conventional "bump test" data.

Figure 2:
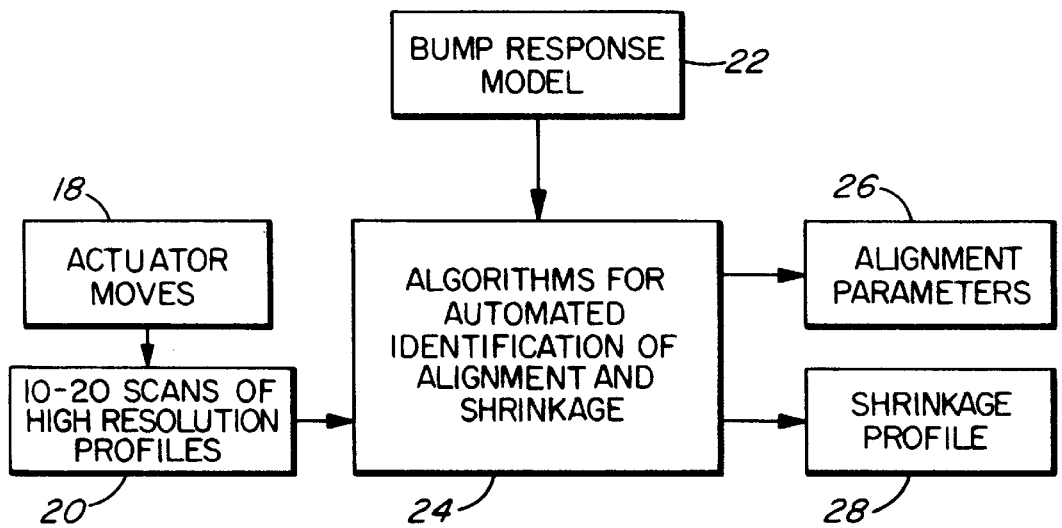
FIG. 2 is a block diagram showing the overall process of the present invention.

FIG. 2 provides a general overview of the process of the present invention. Excitation of the actuators at 18 generates measured response scans at 20 to create a measured actuator response profile. A modeled actuator response profile or bump response model at 22 is also established. The modeled actuator response profile is fitted to the measured actuator response profile using the optimization and fuzzy logic techniques of algorithm 24 to determine alignment and shrinkage parameters at 26 and 28.

The developed algorithms for the process of the present invention are based on the following assumptions about the controlled process:

1. Process dynamics are fast compared to the measurement sampling time, and the process can be modeled with a constant transport delay.
2. Process dynamics are linear and superposition of the actuator responses holds.
3. Spatial responses of all the actuators are the same and known. More precisely, shapes and gains of the spatial responses are the same for all the actuators. (This assumption could be later elaborated to include the case of unknown spatial response of the actuator).
4. Paper shrinkage is relatively low (usually less that 6%) so one can neglect the distortion of spatial response shapes due to the shrinkage and consider only shifts of spatial responses.
5. Measurement noise is an additive noncorrelated white noise.

Though the above assumptions may only be valid to a certain precision, it is believed that they adequately represent the paper-making process in many cases. Note that the assumptions made are the same as the underlying assumptions used for the design of conventional controllers. Thus, identification of the alignment based on the above assumptions is expected to be adequate for controller design purposes.

It is possible to use the process of the present invention to determine alignment parameters for the case of linear shrinkage and the process is intended for automated processing of standard bump test results. The process also includes the ability to automatically identify nonlinear edge shrinkage. For reliable identification of the edge shrinkage, the test data should be obtained by applying a special dense excitation of the edge actuators as will be more fully explained.

Some examples will illustrate the basic principles and the algorithms of the present process. Alignment detection is achieved through an optimization of the response model fit to the experimental data. The following examples will show that reliable and robust detection is possible for a response of a single actuator, as well as for alignment and shrinkage parameters in the linear shrinkage case based on simultaneous response of several actuators.

EXAMPLE 1

Alignment and Shrinkage Identification through model fit to the data

In this example, a simplified model of the paper making process is used. The alignment problem considered here is essentially a CD identification problem, and a very simple model for MD processes is used. It is assumed that MD process dynamics are fast compared to the measurement sampling time and, thus, the process can be modeled as a constant transport delay. This assumption is acceptable, since most paper making processes have time constants less than a scan time, which is typically 20–60 seconds.

In a typical bump test, actuator inputs are constant most of the time, therefore, MD transient processes could deviate from the assumed model for a few scans at most, and the error will propagate mostly in MD and will not spoil CD identification.

As is usual, it is further assumed that the process dynamics are linear which means that the system response can be computed as a superposition of individual actuator responses. Spatial responses of all the actuators are assumed to have the same and known shape. More precisely, gains and parameters of the spatial responses are assumed to be the same for all the actuators. Paper shrinkage is usually relatively small (typically less that 6%), so it is possible to neglect distortion of the spatial response shapes due to the shrinkage and consider only shifts of the spatial responses.

A vector $v(t)$ of the actuator positions at time t is denoted by, $$v(t) = [\,v_1(t) \quad v_2(t) \quad \ldots \quad v_n(t)\,]^T \in \mathcal{R}^n, \qquad (1)$$

where n is a number of CD actuators in the array. Similarly, a minislice vector $q(t)$ of the scanned data at time t is denoted by, $$q(t) = [\,q_1(t) \quad q_2(t) \quad \ldots \quad q_m(t)\,]^T \in \mathcal{R}^m, \qquad (2)$$

where m is a number of high resolution measurements in the data scan. $v^0$ and $p^0$ denote baseline profiles of the actuators and high resolution measurements, respectively. It will be further convenient to consider variations of the profiles with respect to the baseline: an actuator profile variation $u(t)=v(t)-v^0$, and a high resolution profile variation $p(t)=q(t)-q^0$.

In accordance with the assumptions made above, variations of the actuator and high resolution profiles are linearly related. By denoting $p(t)$ the profile computed using the formulated model, it is possible to write $$\hat{p}(t+d) = \sum_{j=1}^{n} u_j(t) g^j, \qquad (3)$$

where $g^j \in \mathcal{R}^m$ are vectors describing high-resolution response profile shapes for individual actuators and d is the transport delay of the process. The alignment problem is to determine centres of the responses $g^j$. The form of these vectors will be discussed in more detail.

By putting together relationships of form (3) for the times $t=1, \ldots, N$, the relationship between the input and output identification data is obtained in the form:

$$\hat{P} = GU, \quad (4)$$

$$\hat{P} = [\hat{p}(1+d) \quad \ldots \quad \hat{p}(N+d)] \in \mathcal{R}^{m,N}, \quad (5)$$
$$U = [u(1) \quad \ldots \quad u(N)] \in \mathcal{R}^{n,N},$$
$$G = [g^1 \quad \ldots \quad g^2] \in \mathcal{R}^{m,n},$$

where $\hat{P}$ is the output (profile) data matrix predicted using the model, U is the input (actuator) data matrix, and G is the system gain matrix. Columns of matrix G are the actuator response shapes $g^j$.

Model of a single actuator response

For what follows, it is important to formulate a model for the shape of the actuator response described by the vector $g^j$. The assumed shape of the actuator response should be defined by a small number of parameters and should allow for a sufficiently close approximation of the response shapes typically encountered in practice.

It is assumed that responses of the actuators are of the same shape and differ only by a shift in the CD coordinate, which will be denoted by x. Each response $g^j$ is obtained by sampling a continuous response function of the actuator at the scanner sampling coordinates x=k. Thus, the components of the response gain vector $g^k$ have the form $$g_k{}^j = b(kd_a - c_j), k=1, \ldots, m, \quad (6)$$

where $c_j$ is the centre of the response for the actuator k, $b(x)$ is a continuous response function (the same for all actuators), and $d_a$ is a CD sampling internal for the scanner high resolution profile.

After a study of a number of typical response shapes obtained in experiments with the actuators of different type, it was decided to assume a continuous response shape of the form $$b(x) = g_0 e^{-ax^2/w^2} \cos\frac{\pi x}{w}, \quad (7)$$

where the three parameters $g_0$, w, and a define the response shape from the following meaning:

$g_0$ is the response gain (maximal height of the response);
w is the response width parameter;
a is the attenuation parameter that defines how oscillatory the response is.

Figure 3:
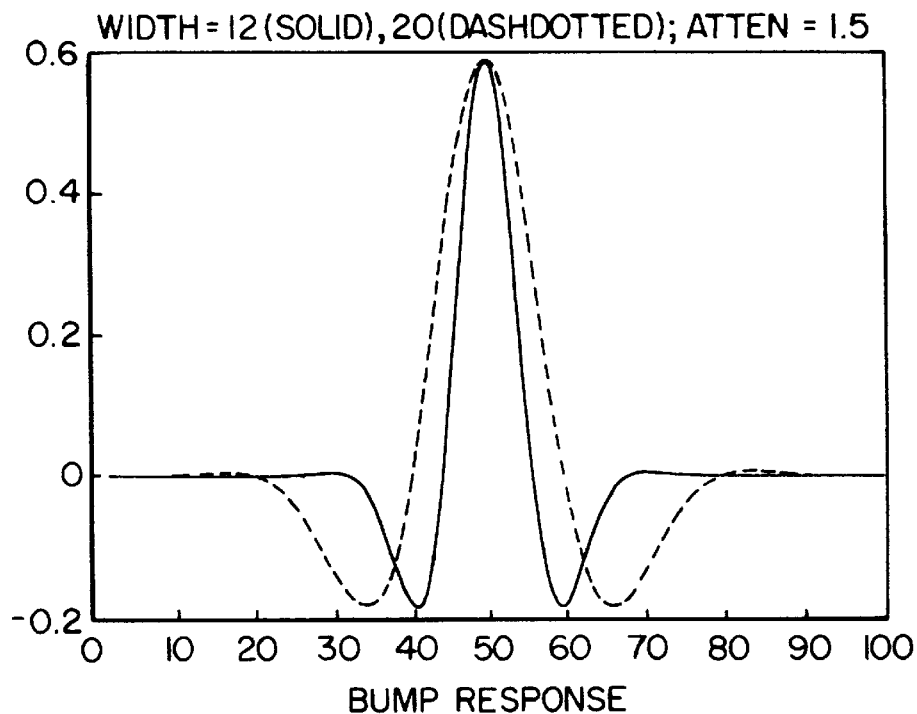
FIG. 3 shows an example of a response shape selected to model the response profile and variation of the response shape with the width parameter w.
Figure 4:
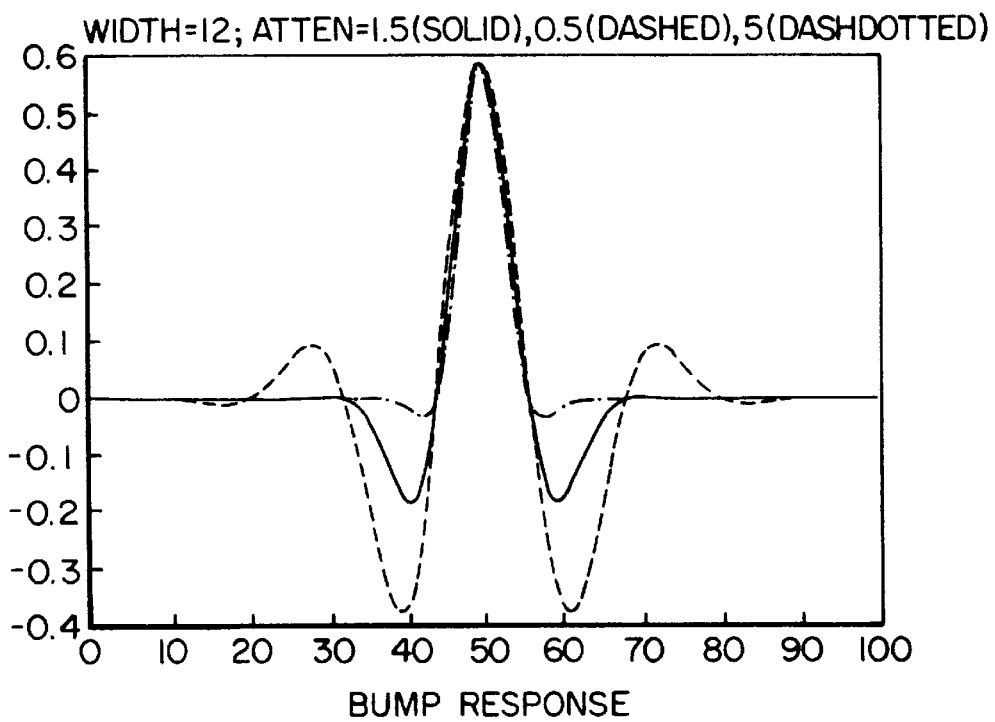

FIGS. 3 and 4 show the variation of the response with the parameters w and a. The parameters $g_0$ and w define the linear transformation of the response by stretching it in vertical and horizontal directions, respectively. FIG. 3 shows the effect of changes in w. The attenuation parameter a changes the shape of the response by changing the size of its negative lobes as shown in FIG. 4. For a large a, these lobes are practically absent, for a smaller a they are more profound.

One of the advantages of the response representation (7) is that it contains a Gaussian function multiplier and vanishes very fast away from its centre. This helps to speed up computations, where such responses are involved. At a distance of more than 4 w from its centre, the response is less than $10^{-7}$, which is negligibly small for computations.

It should be noted that it is possible to use other response shapes for the modeled response. For example, the following formula denotes another response shape, $$r(x) = \frac{1}{2}b(x-d) + \frac{1}{2}b(x+d)$$

where d defines the distance between peaks of the response, and $b(x)$ is the equation above.

Determining the response centre for a single actuator

To identify the alignment parameters, it is necessary to find the best fit (maximal correlation) of the modeled system response and the measured response. In order to understand how this approach works, it is best to start by fitting a model of a single actuator response to results of a bump test for a single actuator.

For a bump test of a single actuator, the modeled response y to the actuator move of amplitude u in accordance with (3), and (6) has the form $$\hat{y} = ug(c), u \in \mathcal{R}, y \in \mathcal{R}^m, \quad (8)$$

$$g(c) = [b(d_n - c) \quad \ldots, \quad b(md_a - c)]^T \in \mathcal{R}^m, \quad (9)$$

where u is the amplitude of the actuator move (scalar), $g(c)$ is the response shape vector for the selected actuator, c is the response centre, and $\hat{y}$ is the predicted response profile. The response centre c can be estimated by minimizing a quadratic loss index of the form $$J(c) = \|y - \hat{y}(c)\|^2 \to \min, \quad (10)$$

where y is the vector of the averaged response profile measured in the bump test, and $\|\cdot\|$ denotes the Euclidean ($L_2$) norm of a vector. The predicted response profile y in (10) is a function of the assumed response centre position c.

Figure 5A:
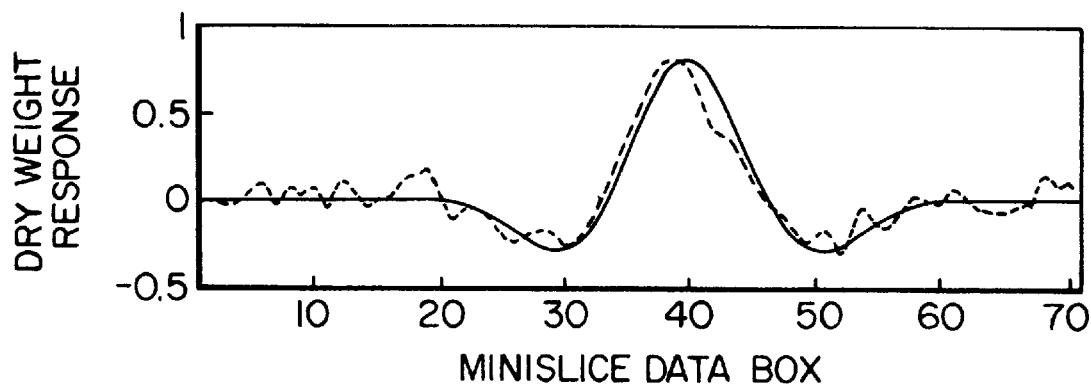
FIG. 5 shows the measured and modeled actuator response profiles and the computed loss index for a single actuator obtained using the process of the present invention.
Figure 5B:
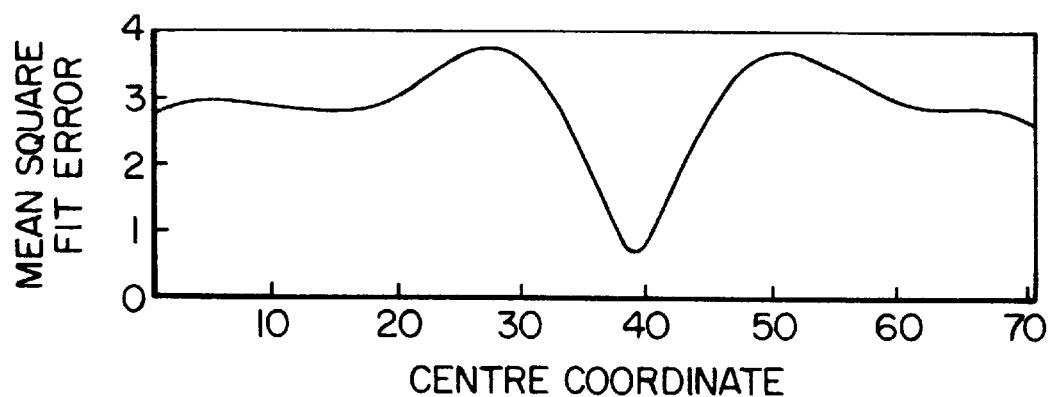

To illustrate how the loss index (10) depends on the centre position, FIG. 5 shows such dependence computed using the bump test data from a mill in the United States. In the upper plot of FIG. 5, the measured (dashed) and modeled (solid) response profiles are shown. the lower plot shows the loss index $J(c)$. It is evident that despite the noise in the data, the dependence $J(c)$ in FIG. 5 has a clear cut minimum, which corresponds to the correct estimate of the actuator bump position. The experimental response profile y was obtained by averaging 10 high resolution profiles after the selected actuator was bumped and removing the baseline. The baseline was computed by averaging 10 data profiles immediately before bumping the actuator.

The results shown in FIG. 5 were obtained using a bump response model that closely corresponds to the actual bump response shape. Since in practice the bump response shape is not known exactly, it is important for the proposed method to be robust to mismodeling of the bump response shape. Experiments demonstrate that the robustness is indeed excellent. Results obtained with a 50% variation of all three parameters of the modeled bump response shape (7) allow reliable recovery of the bump response centre. Though minimal achievable error of the fit varies widely with the parameter variation, the location of the minimum accurately coincides with the bump response centre.

This fact shows that an accurate identification of the alignment using the process of the present invention is possible even without an accurate knowledge of the response shape.

EXAMPLE 2

Determining linear shrinkage and alignment for multiple actuators

The results described above for identification of a single bump response centre are promising. The foregoing results can be extended to the problem of alignment parameter identification in the case of linear shrinkage of the sheet.

Let $a_k$ denote a CD coordinate of the k-th actuator in the actuator array. For linear shrinkage, a coordinate of the bump response centre $c_k$ for this actuator can be computed as $$c_k = \alpha_1 + a_k \alpha_2 \quad (11)$$

Parameters $a_1$ and $a_2$ of the linear dependence (11) are the intercept and slope, respectively. The relationship (11) can be written in a general vector form as follows $$c = f(\alpha), \; c = [c_1 \ldots c_n]^T \in \mathcal{R}^n, \quad (12)$$

where $\alpha = [\alpha_1 \; \alpha_2] \in \mathcal{R}^2$ is the vector of the alignment parameters and $f: \mathcal{R}^2 \to \mathcal{R}^n$ is a linear mapping that defines the response centres through the alignment parameters in accordance with 11).

By using (4), the model fit error can be presented in the form $$Y(c) = P - G(c)U, \quad (13)$$

$$G = [\; g(c_1) \; \ldots, \; g(c_n) \;] \in \mathcal{R}^{m,n}, \quad (14)$$

$$P = [\; p(1+d) \; \ldots \; p(T+d) \;] \in \mathcal{R}^{m,N}, \quad (15)$$

where the columns of the system gain matrix G(c) are computed in accordance with (9), as before, $p(t) = q(t) - q^0$ is a measured high resolution profile at time t with the removed baseline, and matrix $U \in \mathcal{R}^{n,N}$ is the same as in (5).

The quality of the model fit can be evaluated using the quadratic loss index of the form $$J(c) = \|Y(c)\|_F^2 \equiv \|\text{vec}(Y(c))\|^2 \to \min, \quad (16)$$

where $\|\cdot\|_F$ is a Frobenius norm and vec(·) denotes a vectorization of a matrix, i.e., a vector that contains all the entries of the given matrix, column by column. The squared Frobenius norm of the matrix Y is a sum of all squared entries of this matrix, which coincides with the squared Euclidean norm $\|\text{vec}(Y(c))\|^2$. The mathematical operation vec(·) corresponds to the MATLAB operation (:). The loss index (16) incorporated quadratic error of model fit computed for all available data points.

It is assumed that the parameters of the bump response shape (7) are fixed and a linear shrinkage model is assumed that gives the response centre distribution (12). Then the loss index (16) can be written as a function of the two alignment parameters $a_1$ and $a_2$ in (11) as $$J(c)|_{c=f(\alpha)} = J(f(\alpha)) \equiv J[\alpha] \quad (17)$$

Figure 6:
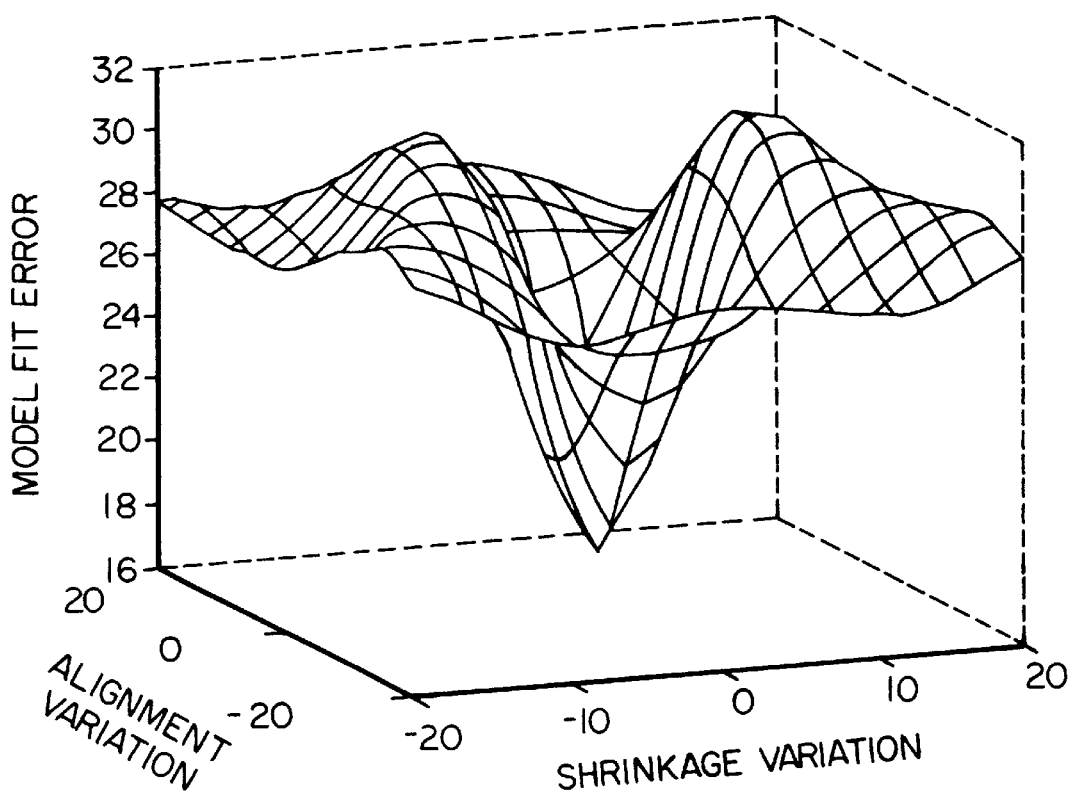
FIG. 6 is a graph of the dependence of the quadratic loss index on the variation of two alignment parameters.

FIG. 6 illustrates the dependence (17) of the loss index on the two alignment parameters, $a_1$ and $a_2$. The bump test data used for the computation are the same as in FIG. 5 with the difference that, unlike FIG. 5, moves of all the actuators were taken into account through the matrix U in (13).

The loss surface in FIG. 6 has a clearly defined minimum, which can be used for finding the best estimates of the alignment parameters. The shape of the loss surface in FIG. 6, in general, will depend on the parameters of the used system response model, in particular, on the parameters of the bump response shape. However, the loss surface still has a clearly defined minimum, and the location of this minimum remains very much the same even for severely wrong estimates of the bump response shape.

Iterative optimization of the model fit

An iterative computational scheme for optimization of the response model fit has also been developed. The iterative algorithm has been developed for automated identification of nonlinear shrinkage. The algorithm works with large arrays of data and it is optimized to reduce the iteration time.

To make the exposition more transparent, it is desirable to consider the simpler problem of identifying the alignment for a linear shrinkage. A more complicated problem of identifying a nonlinear shrinkage and alignment will then be examined. The iterative algorithm is developed in a general matrix form and can be simply extended for the nonlinear shrinkage identification problem that follows.

EXAMPLE 3

Optimization problem

The optimization problem considered herein is formulated in the previous section. This problem is given by (7), (9), (12), (13)–(15), (16) and can be briefly summarized as follows $$J[\alpha] = \|Z[\alpha]\|^2 \to \min \quad (18)$$

$$Z[\alpha] = \text{vec}(Y(c)|_{c=f(\alpha)}); \quad (19)$$
$$Y(c) = P - G(c)U, \; G(c) = [\; g(c_1) \; \ldots \; g(c_n) \;]$$

where $\alpha$ is the vector of the alignment parameters in (12).

The dependence $J[\alpha]$ of the loss index (18) can be computed numerically by finding the model fit error Y(c) (19) for various combinations of the alignment parameters $\alpha = [\alpha_1 \; \alpha_2]^T$. Such numerically found dependence is illustrated in FIG. 6. However, plotting of such a dependence requires computation of the error matrix Y for 8×8=64 different values of the alignment parameters, which translates into a long computation time and provides only a very coarse guess of the optimum location.

An accurate computation of the optimal parameters a is, however, possible by using one of the available iterative optimization methods. Optimization of the loss index (18) is a standard Nonlinear Least Square (NLS) problem. It is well acknowledged in the field that one of the best methods for iterative numerical solutions of such a problem is the Levenberg-Marquardt method. Other well known methods, such as Gauss-Newton or Gradient Descent, can be considered as special cases of the Levenberg-Marquardt scheme obtained for special values of the scheme parameters.

For the problem in question, it is not desirable to use standard code for the Levenberg-Marquardt optimization, because such code is by necessity universal and does not consider specific features of the problem. Therefore, such standard code will be not optimal and slow. The nonlinear least squares optimization problem that will be considered has a very high dimension (vector vec(Y) can easily have a dimension $40 \times 400 = 1.2 \cdot 10^4$), and possesses a special structure. The next sections review the Levenberg-Marquardt optimization scheme and suggest optimized computations for this scheme by exploiting the special structure of the problem.

Levenberg-Marquardt optimization scheme

The Levenberg-Marquardt optimization scheme can be easily derived by assuming a local affine model for the nonlinear mapping $Z[\alpha]$ at the optimization step k. This model has the form $$Z[\alpha] = Z^{(k)} + \frac{\partial Z}{\partial \alpha}(\alpha - \alpha^{(k)}), \qquad (20)$$

where $\alpha^{(k)}$ and $Z^{(k)}$ are respectively the alignment parameter vector $\alpha$ and the model fit error vector Z at the iteration k. The gradient matrix $\partial Z/\partial \alpha$ should be computed for the parameters $\alpha = \alpha^{(k)}$.

By substituting the affine model (20) into the problem (18), a quadratic optimization problem is obtained that is easily solvable to immediately find an updated guess $a^{(k+1)}$ for the optimal vector $\alpha$. The Levenberg-Marquardt method imposes an additional limitation on the optimization step length of the form: $\|\alpha^{(k+1)} - \alpha^{(k)}\|^2 \leq d^2$, where d is the maximal allowed step length. By using the Lagrange multiplier method to take into the account this step limitation, a solution to the problem (20), (18) is obtained that provides the Levenberg-Marquardt update of the optimal solution guess in the form $$\alpha^{(k+1)} = \alpha^{(k)} - \left[\mu I + \left(\frac{\partial Z}{\partial \alpha}\right)^T \frac{\partial Z}{\partial \alpha}\right]^{-1}\left[\left(\frac{\partial Z}{\partial \alpha}\right)^T Z[\alpha^{(k)}]\right], \qquad (21)$$

where I is a unit matrix of the size $\dim(\alpha)=2$ and $\mu \geq 0$ is a scalar Lagrange multiplier responsible for the step limitation.

To apply the Levenberg-Marquardt method (21) to the problem in question, it is necessary to be able to compute the gradient $\partial Z/\partial \alpha$ and the modified Hessian=the matrix inverted in (21) at each optimization step. A discussion of how to do this in an optimized way to reduce the amount of computations follows.

Computation of gradient

Computation of the gradient $\partial Z/\partial \alpha$ can be found accordance with (19) by using the chain differentiation rule $$\frac{\partial Z}{\partial \alpha} = \frac{\partial \text{vec}(Y(c))}{\partial c} \cdot \frac{\partial f(\alpha)}{\partial \alpha} = -\frac{\partial \text{vec}(G(c)U)}{\partial c} \cdot \frac{\partial f(\alpha)}{\partial \alpha} \qquad (22)$$

For linear shrinkage, the mapping (12) is defined by (11). The second multiplier in (22) is the Jacobian matrix of the mapping (12). Entries of the Jacobian matrix can be obtained by differentiating (12), and this matrix has the form $$\frac{\partial f(\alpha)}{\partial \alpha} = \begin{bmatrix} 1 & 1 & \dots & 1 \\ \alpha_1 & \alpha_2 & \dots & \alpha_n \end{bmatrix}^T \qquad (23)$$

In order to compute the first multiplier in (22), it is necessary to write by further using (19)

$$G(c)U = \sum_{j=1}^{n} g(c_j)\underline{u}_j^T, \qquad (24)$$

$$\underline{u}_j = [u_j(1), \dots, u_j(N)]^T, \qquad (25)$$

there the vector $u_j$ consists of the moves of the same actuator j at different times.

By using the representation (24)–(25), it is possible to find columns of the first matrix in r.h.s. of (22). By $$\frac{\partial g(c_j)}{\partial c_k} = 0 \text{ for } j \neq k, \text{ the result is}^1$$

$$\frac{\partial \text{vec}(G(c)U)}{\partial c_j} = \frac{\partial \text{vec}(g(c_j)\underline{u}_j^T)}{\partial c_j} = \text{vec}\left(\frac{\partial g(c_j)}{\partial c_j}\underline{u}_j^T\right) = -g'(c_j) \otimes \underline{u}_j, \qquad (26)$$

$$g'(c) = [b'(d_a - c) \dots b'(d_a N - c)]^T \in \mathcal{R}^m, \qquad (27)$$

[1] Here the following matrix equality is used [1] $\text{vec}(A X B^T) \equiv (A \otimes B)\text{vec}(X)$.

where denotes the Kronecker product of the matrices and $b'(\cdot)$ is the derivative of the actuator CD response shape (7). From (7) the derivative can be obtained analytically $$b'(x) = -g_0 e^{-\frac{ax^2}{w^2}}\left(\frac{2ax}{w^2}\cos\pi\frac{x}{w} + \frac{\pi}{w}\sin\frac{\pi x}{w}\right) \qquad (28)$$

Finally, by using (22), (26)–(28), we obtain $$\frac{\partial Z(c)}{\partial c} = [g'(c_1) \otimes \underline{u}_1 \dots g'(c_N) \otimes \underline{u}_N] \in \mathcal{R}^{mN,n} \qquad (29)$$

Equations (22), (29), (25), (27), and (28) permit computation of the gradient of the loss index analytically. Note, however, that the gradient matrix (29) can have a very large dimension and the computation of the gradient will require a significant amount of computer memory storage and computational time.

Computation of Hessian

The computation of the modified Hessian matrix—the matrix inverted in (21)—requires multiplication of the gradient matrices. This computation can be optimized thanks to the special structure of these matrices. First, applying the chain differentiation rule allows the Hessian to be written in the form $$\left(\frac{\partial Z}{\partial \alpha}\right)^T \frac{\partial Z}{\partial \alpha} = \left(\frac{\partial c}{\partial \alpha}\right)^T \cdot \left[\left(\frac{\partial Z}{\partial c}\right)^T \frac{\partial Z}{\partial c}\right] \cdot \frac{\partial c}{\partial \alpha} \quad (30)$$

The most computationally expensive part of (30) is related to the computation of the matrix in square brackets. This matrix is a product of two matrices of the size mN×n and its straightforward computation would involve $n^2 mN$ multiplications. For n=200, m=800, and N=20 this makes $6.4 \cdot 10^8$ multiplications, which would take at least 2560 s≈43 min for double precision arithmetic on a typical 1 Mflops PC. Such time is clearly unacceptable for a single iteration of the method, even taking into account the expected future growth of computational capabilities.

Computational expenses can be greatly reduced. In accordance with (29), the entries of the matrix in square brackets in (30) can be computed as[2]

$$\left[\left(\frac{\partial Z}{\partial c}\right)^T \frac{\partial Z}{\partial c}\right]_{ij} = \left(\frac{\partial Z}{\partial c_i}\right)^T \frac{\partial Z}{\partial c_j} = [g'(c_i) \otimes \underline{u}_i]^T \cdot [g'(c_j) \otimes \underline{u}_j] \quad (31)$$

$$= [g'(c_i)^T \otimes \underline{u}_i^T] \cdot [g'(c_j) \otimes \underline{u}_j]$$

$$= [g'(c_i)^T g'(c_j)] \cdot [\underline{u}_i^T \underline{u}_j]$$

[2] Here we use another matrix equality which holds for the Kronecker product [1]:(A⊗B)(C⊗D)≡AC⊗BD.

Collecting together equalities of the form (31) for all components of the modified Hessian matrix results in $$\left[\left(\frac{\partial Z}{\partial c}\right)^T \frac{\partial Z}{\partial c}\right] = [B(c)^T B(c)] \odot [UU^T], \quad (32)$$

$$B(c) = [g'(c_1) \ldots g'(c_N)] \in \mathcal{R}^{m,N}, \quad (33)$$

where ⊙ denotes a component-wise product of two matrices of the same size (the same as .* in MATLAB), matrix B is built of the response shape derivatives in the same way as G in (14) is built of the response shapes, and $U \in \mathcal{R}^{n,N}$ is the input data matrix (5).

The computation of the modified Hessian matrix in accordance with (32) requires $n^2 m + n^2 N$ multiplications, which is by the factor mN/(m+N) less than for the straightforward computations in accordance with (31). For m=800, and N=20 this improvement factor is 19.51 which makes the approach immediately implementable in practice. Further improvement can be achieved by noticing that matrices G and B are, in fact, sparse matrices with a band structure.

EXAMPLE 4

Fuzzy Logic Model for Non-linear Shrinkage Profiles

This example details a Fuzzy Logic model of a nonlinear shrinkage profile characterized by a minimal number of parameters. This facilitates tuning of these parameters for optimal shrinkage detection. This example further presents results of testing the developed algorithms using simulated data and paper machine test data.

The process of the present invention allows for identification of nonlinear shrinkage at paper sheet edges. This problem is more difficult that the identification of alignment parameters in the case of linear shrinkage. By assuming that nonlinear shrinkage has a known parametric form with a few unknown parameters, it becomes possible to identify these parameters from the experimental data. Of course, the pre-assumed parametric shape of the shrinkage profile would not match the actual shrinkage of the paper exactly for any shape parameters. However, from the practical viewpoint, it is only important that the residual error of the identification of actuator response centres is sufficiently small.

In order to simplify the problem statement and practical implementation of the identification algorithms, it is necessary to assume a Fuzzy Logic model of the shrinkage that reflects available expert knowledge of the shrinkage profile. This model should be described by as small a number of parameters as possible.

As is usually done in fuzzy system design, it is necessary to start by defining the input and output linguistic variables for the fuzzy model of the shrinkage profile. The input variable of the model is the CD coordinate x with which will be associated three linguistic labels: low edge, middle, and high edge. The output variable is the paper shrinkage s for which we choose three linguistic labels: $s=s_{low}$, $s=s_0$, and $s=s_{high}$, where $s_{low}$, $s_{high}$, and $s_0$ are the shrinkage on both edges and the middle of the sheet, respectively.

The model is defined by the following simple inference rules:

if [x is low edge]   then $s = s_{low}$   (34)

if [x is middle]    then $s = s_0$ if [x is high edge] then $s = s_{high}$

In order to fuzzify this model and make it work for any crisp value of the input variable x, the membership functions associated with the chosen linguistic variables are defined. $x_{low}$ and $x_{high}$ denote CD coordinates of the low and high edge of the sheet, respectively. The membership functions are of the form $$\mu_{low}(x) = \begin{cases} \sigma'\left(1 - \frac{x_{low} - x}{l_{low}}\right) & \text{for } x \leq l_{low} \\ 0 & \text{for } x > l_{low}, \end{cases} \quad (35)$$

$$\mu_{high}(x) = \begin{cases} \sigma'\left(1 - \frac{x_{high} - x}{l_{high}}\right) & \text{for } x \geq x_{high} - l_{high} \\ 0 & \text{for } x > x_{high} - l_{high}, \end{cases} \quad (36)$$

$$\mu_{middle}(x) = 1 - \mu_{low}(x) - \mu_{high}(x), \quad (37)$$

where σ'(x) is a monotone growing function such that σ'(0)=0 and σ'(1)=1. Note that the membership functions are complementary, i.e., their sum is always one:

$$\mu_{low}(x) + \mu_{middle}(x) + \mu_{high}(x) = 1, \text{ for } x_{low} \leq x \leq x_{high}.$$

The function σ'(x) in the definition of the membership functions (35)–(37) is chosen to be $$\sigma'(x) = 2x^2/(1+x^2) \quad (38)$$

The derivative of this function is zero for x=0 and monotone increasing for 0<x<1. Also σ'(0)=0 and σ'(1)=1. The function (38) seems to define adequately the shrinkage increase at the edges.

Figure 7:
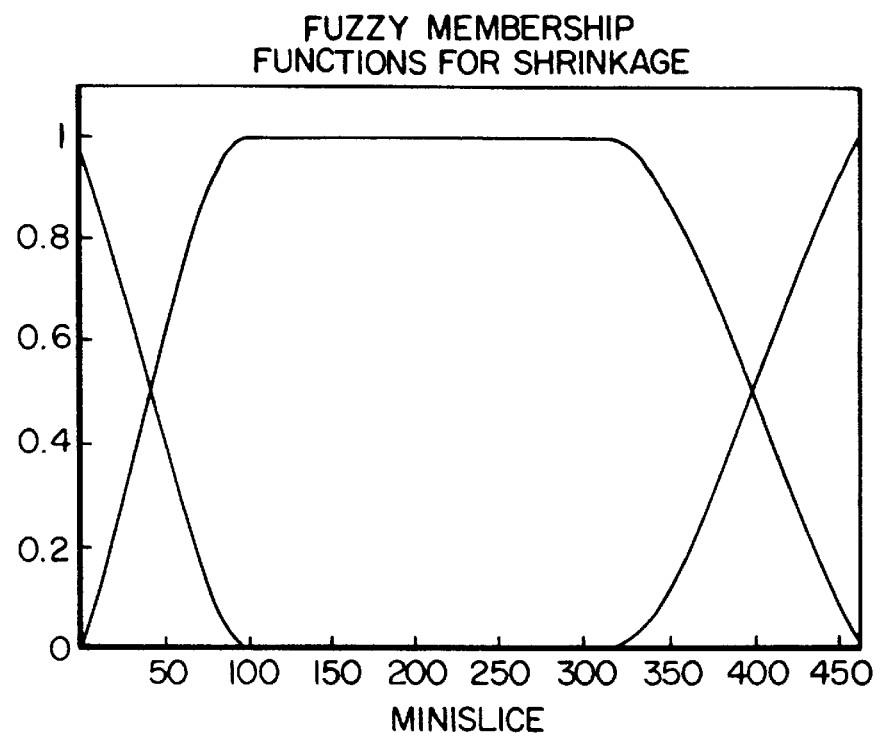
FIG. 7 is a graph of the membership function for fuzzy modeling of the paper shrinkage profile useful in the process of the present application.

Since it is assumed that always $$x_{low} \leq x \leq x_{high} \text{ and } x_{low}+l_{low} \leq l_{high}-x_{high},$$

the membership functions (35)–(37) always have maximal value 1 and minimal value 1 and look like those shown in FIG. 7.

The Centre-of-heights defuzzification rule is used to obtain the following value of the shrinkage for a CD coordinate x inside the sheet $$s(x) = \frac{s_{low}\mu_{low}(x) + s_0\mu_{middle}(x) + s_{high}\mu_{high}(x)}{\mu_{low}(x) + \mu_{middle}(x) + \mu_{high}(x)}, \qquad (39)$$

where, in accordance with (37), the denominator is always equal to one. From (35)–(37) and (37), the shrinkage profile—dependence of the shrinkage on the CD coordinate—is of the form $$s(x) = \begin{cases} s_0 + (s_{low} - s_0)\sigma'\left(1 - \frac{x - x_{low}}{l_{low}}\right) & \text{for } x \leq l_{low} \\ s_0 & \text{for } l_{low} < x < x_{high} - l_{high} \\ s_0 + (s_{high} - s_0)\sigma'\left(1 - \frac{x_{high} - x}{l_{high}}\right) & \text{for } x \geq x_{high} - l_{high} \end{cases} \qquad (40)$$

The shrinkage profile (40) is fully defined by the five parameters: three shrinkages $s_{low}$, $s_{high}$, and $s_0$; and two widths of the edge nonlinear shrinkage zones $l_{low}$ and $l_{high}$.

Identification of shrinkage profile parameters

The paper shrinkage influences the system response data through the shift of the actuator response centres that it causes. The response centres depend on the shrinkage parameters. $\phi(a): \Re \to \Re$ denotes the mapping between the CD coordinate a of the paper on the actuator side and the corresponding point on the scanner side. Then, a coordinate of the bump response centre for the actuator k is $$c_k = \phi(a_k), \qquad (41)$$

where $a_k$ is the coordinate of the k-th actuator centre. For linear shrinkage, the mapping $\phi(a)$ (41) has the form (11).

The shrinkage s at point x can be defined as a relative reduction of the distance between two close paper points after the mapping $\phi(\bullet)$ is applied. Taking an infinitesimal variation of the coordinate x, provides the shrinkage:

$$s(x) = \frac{dx - (\phi(x + dx) - \phi(x))}{dx} = 1 - \phi'(x) \qquad (42)$$

The mapping $\phi(x)$ can be found by substituting shrinkage profile (40) into (42) and integrating it. The mapping obtained by integrating the shrinkage will depend on a free constant. This free constant defines the paper alignment. To make the integration more convenient, it is assumed that the alignment is defined for a chosen point in the middle of the sheet that has a coordinate $x_0=(x_{low}+x_{high})/2$. This point is mapped into the scanner side point with a coordinate $c_0$. The coordinate $c_0$ defines the paper alignment and should be experimentally identified.

By integrating (40) and (42) as described, the actuator centre coordinates (41) are obtained in the form $$c_k = c_0 + (a_k - x_0)(1 - s_0) - \Delta\phi(a_k) \qquad (43)$$

$$\Delta\phi(a_k) = \begin{cases} (s_{low} - s_0)l_{low}\sigma\left(1 - \frac{a_k - x_{low}}{l_{low}}\right) & \text{if } a_k \leq l_{low} \\ 0 & \text{if } l_{low} < a_k < x_{high} - l_{high} \\ (s_{high} - s_0)l_{high}\sigma\left(1 - \frac{x_{high} - a_k}{l_{high}}\right) & \text{if } a_k \geq x_{high} - l_{high}, \end{cases}$$

where $\Delta\phi(a_k)$ is the response centre displacement caused by the nonlinear shrinkage. The function $\phi(x)$ in (43) is the integral of the function (38) that can be computed analytically as $$\sigma(x) = 2(x - a\tan(x)) \qquad (44)$$

The response centres computed in accordance with (43) are fully defined by the following six parameters: one alignment parameter $c_0$; three shrinkages $s_{low}$, $s_{high}$, and $s_0$; and two widths of the edge nonlinear shrinkage zones $l_{low}$ and $l_{high}$.

By putting together expressions (43) for all the response centres, they can be written a general vector form (12), where the parameter vector $\alpha$ now has six components mentioned above, instead of only two as in the case of the linear shrinkage. These six alignment/shrinkage parameters can be identified by means of the iterative minimization of the model fit error as it is described in Example 3. The algorithms of Example 3 are formulated in a general matrix form and they are applicable for a mapping $c=f(\alpha)$ of a general type.

Unfortunately, straightforward implementation of the Example 3 algorithm for the mapping (12) defined by (43) and the parameter vector $\alpha$ of the form $$\alpha = [c_0 \ s_0 \ s_{low} \ s_{high} \ l_{low} \ l_{high}]^T \qquad (45)$$

is hardly possible. The reason for that is that the Hessian matrix (30) is in that case ill-conditioned because the multiplier matrix $\partial c/\partial\alpha = \partial f(\alpha)/\partial\alpha$ is ill-conditioned.

Getting rid of ill-conditioning by change of variables

In order to improve the condition number of the Jacobian matrix $\partial f(\alpha)/\partial\alpha$ it is possible to define the following set of the shrinkage/alignment parameters, which is obtained from (45) by a nonlinear transformation $$\alpha = [c_0 1 - s_0 r_{low} r_{high} a_{low} a_{high}]^T \qquad (46)$$

$$a_{low} = (s_{low} - s_0)l_{low}, \qquad (47)$$

$$a_{high} = (s_{high} - s_0)l_{high},$$

$$r_{low} = l_{low}/l_0, \qquad (48)$$

$$r_{high} = l_{high}/l_0,$$

where $l_0$ is a scaling parameter that has a physical meaning of the minimal encountered width of the edge zones with the nonlinear shrinkage.

The transformations (47)–(48) is defined analytically and can be easily computed, as well as the inverse transformation. With the parameter vector $\alpha$ defined by (46)–(48), the coordinates of the actuator response centres (43) can be presented in the form $$c_k(\alpha) = \alpha_1 + (a_k - x_0)\alpha_2 - \Delta\phi(a_k, \alpha), \quad (49)$$

$$\Delta\phi(a_k, \alpha) = \begin{cases} \alpha_3\sigma\left(1 - \dfrac{a_k - x_{low}}{\alpha_5 l_0}\right) & \text{if } a_k \le \alpha_5 l_0 \\ 0 & \text{if } \alpha_5 l_0 < a_k < x_{high} - \alpha_6 l_0 \\ \alpha_4\sigma\left(1 - \dfrac{x_{high} - x}{\alpha_6 l_0}\right) & \text{if } a_k \ge x_{high} - \alpha_6 l_0, \end{cases}$$

where $\alpha_j$ is the j-th component of the vector $\alpha$ (46).

Expression (49) defines the mapping $c=f(\alpha)$ (12) used in the Levenberg-Marquardt iterative optimization scheme of Example 3. By differentiating the expression (49), the entries for the Jacobian matrix of this mapping $\partial c/\partial \alpha \in \Re^{n,6}$ are obtained as follows $$\left[\frac{\partial c}{\partial \alpha}\right]_{1,k} = 1, \quad (50)$$

$$\left[\frac{\partial c}{\partial \alpha}\right]_{2,k} = a_k - x_0,$$

$$\left[\frac{\partial c}{\partial \alpha}\right]_{3,k} = \begin{cases} \sigma\left(1 - \dfrac{a_k - x_{low}}{\alpha_5 l_0}\right) & \text{if } a_k \le l_{low} \\ 0 & \text{otherwise}, \end{cases}$$

$$\left[\frac{\partial c}{\partial \alpha}\right]_{4,k} = \begin{cases} \sigma\left(1 - \dfrac{x_{high} - a_k}{\alpha_6 l_0}\right) & \text{if } a_k \ge x_{high} - \alpha_6 l_0 \\ 0 & \text{otherwise}, \end{cases}$$

$$\left[\frac{\partial c}{\partial \alpha}\right]_{5,k} = \begin{cases} \alpha_3 \dfrac{a_k - x_{low}}{\alpha_5^2 l_0} \sigma\left(1 - \dfrac{a_k - x_{low}}{\alpha_5 l_0}\right) & \text{if } a_k \le \alpha_5 l_0 \\ 0 & \text{otherwise}, \end{cases}$$

$$\left[\frac{\partial c}{\partial \alpha}\right]_{6,k} = \begin{cases} \alpha_5 \dfrac{x_{high} - a_k}{\alpha_6^2 l_0} \sigma\left(1 - \dfrac{x_{high} - a_k}{\alpha_6 l_0}\right) & \text{if } a_k \ge x_{high} - \alpha_6 l_0 \\ 0 & \text{otherwise} \end{cases}$$

Excitation Patterns

Accuracy of the shrinkage/alignment parameter identification according to the process of the present invention depends on how well the contribution of different parameters is excited by the input signal sequences collected in the matrix U.

This section discusses a design of the excitation pattern U that allows for the reliable identification of the nonlinear shrinkage profile as discussed above.

The influence of individual parameters on the value of the loss index (18) is defined by the Hessian matrix (30), which is, essentially, the Fisher information matrix for the identification problem in question. In accordance with (32), the Hessian matrix includes the excitation matrix $UU^T$ as a multiplier. Entries of the matrix $UU^T$ are the cross-products of the actuator move sequences (25). In accordance with (33) and (28), the matrix $B^TB$ is a band diagonal matrix, because derivatives of the actuator step responses vanish fast away from the response centres. The excitation matrix $UU^T$ is multiplied by $B^TB$ element-wise, which masks out all but diagonal elements of $UU^T$. Thus, it is possible to provide for optimally conditioned observations by applying the actuator excitation sequences (25) that are orthogonal for a few neighbouring actuators.

In a classic bump test experiment that can be used for the identification of linear shrinkage and alignment as discussed in Examples 1 and 2, the perturbed actuators are usually far enough apart from each other so that their responses do not overlap. Therefore, the excitation matrix $UU^T$ is a diagonal one with zero and nonuser elements on the diagonal For the identification of the nonlinear shrinkage as it is described in this section, the density of the excitation should be higher at the edges to ensure a reliable identification. Mathematically, this corresponds to the fact that the matrix (32) in the Hessian (30) is multiplied by the matrix $\partial c/\partial \alpha$ (50) last four columns of which are zero outside the edges. Therefore, sufficiently many entries of the matrix $UU^T$ should be nonzero near the edges.

The excitation pattern at the edges is designed to take this into account. The requirements to design of this excitation pattern are as follows:

move patterns of a few neighbouring actuator should be orthogonal;

it is desirable to maintain constant actuator position most of the time;

each actuator should do as few moves as possible.

The last two requirements are related to the fact that the assumed model of the identified system neglects process dynamics. Therefore, a deviation from the assumed model will occur each time an actuator moves, and we need to reduce the number of the moves to keep the identification error low.

Actuator excitation patterns that satisfy all the three above conditions are provided by Walsh functions. These functions are piece-wise constant functions that take two values +1 and −1, are orthogonal to each other, and have a number of switchings (zero crossing) equal to the Walsh function number. Therefore, it is appropriate to take a few first Walsh functions as the excitation functions.

Figure 8:
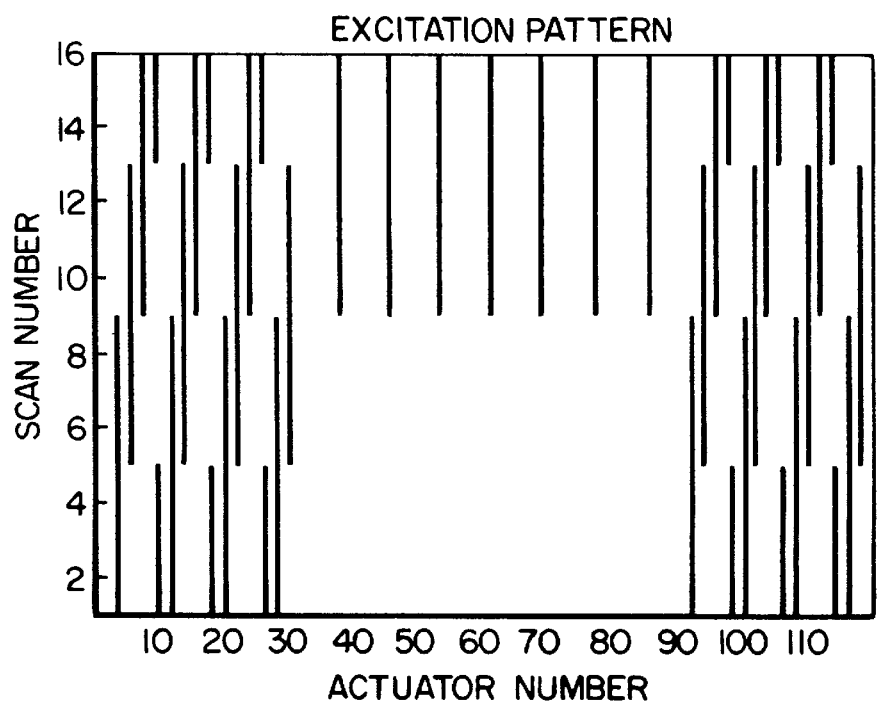
FIG. 8 is a plot of the Walsh function excitation pattern for the actuators.

A possible designed excitation pattern is shown in FIG. 8. The edge actuators are excited using a more dense Walsh function pattern, the middle actuators are excited using a classical bump test pattern. The edge excitation pattern shown in FIG. 8 is periodical with a period of eight actuator zones. This period of the pattern is well above a half-width of the actuator response in most cases.

Thus, the responses obtained for the middle actuators can be used for the visual control of the test results and preliminary (manual) identification of the actuator CD response shape.

Trial Results

In order to validate the developed algorithms and software, a number of tests were completed using both bump test data obtained from different paper machines and simulated identification experiment data obtained with a simulator of the paper making process.

Figure 9A:
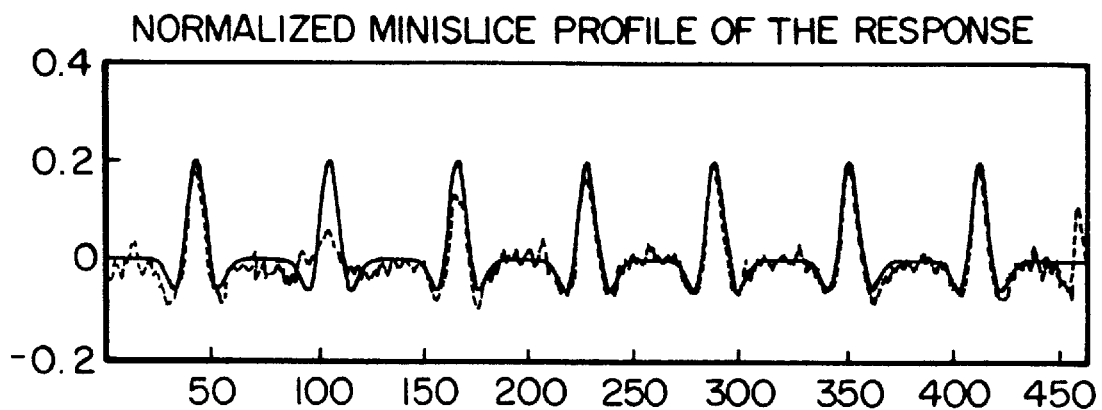
FIGS. 9 to 12 are graphs showing shrinkage and alignment identification profiles established using the process of the present invention using actual test data.
Figure 9B:
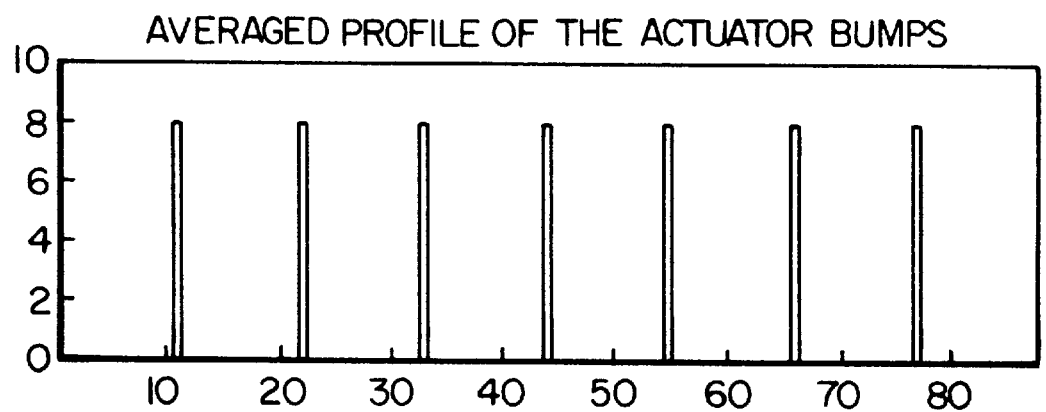

FIG. 9 shows the results of the alignment and shrinkage identification obtained by applying the algorithms described in Examples 2 and 3 to real bump test data. This figure illustrates application of the developed software to the automation of actuator and scanner alignment based on the bump test results. The high resolution dryweight and AutoSlice actuator profiles were collected on a Champion Sheldon, Tex., paper mill in January 1995. The algorithm was applied to the data logged during 25 consecutive scans covering baseline data collection and a bump test. FIG. 9, as well as subsequent figures show averaged bump response profiles with averaged baseline deducted. The same is done for the profiles predicted using a model. The is done with the purpose of the results display only. In fact, the developed alignment process works with the entire data set simultaneously taking into account exact timing and sequence of moves for each actuator. For the results in FIG. 9, the convergence of the algorithm is achieved in 3–6 iterations (20–40 seconds) depending on the initial (manual) alignment error.

Figure 10A:
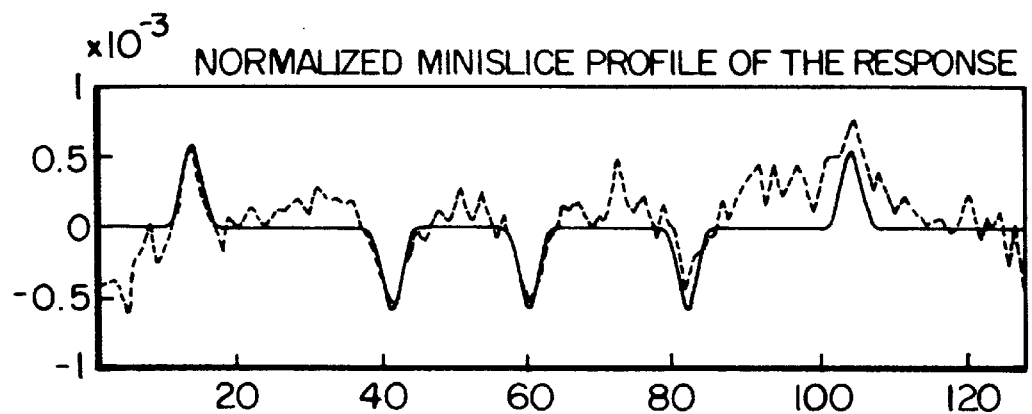
Figure 10B:
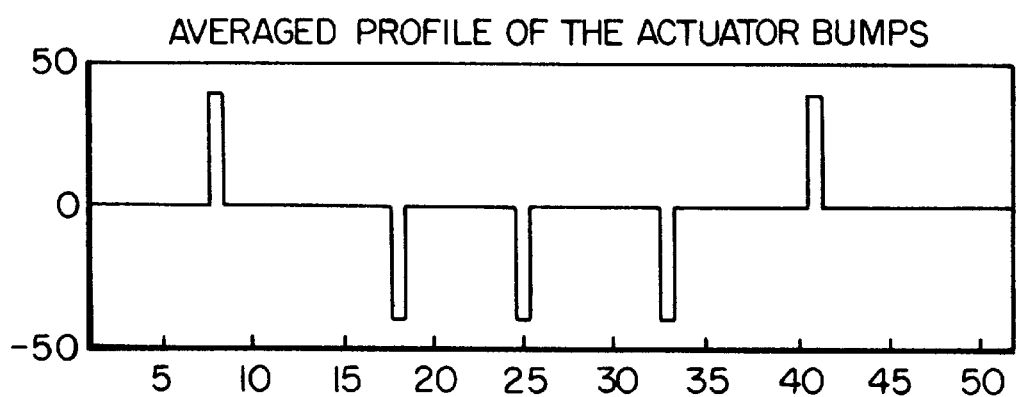

FIG. 10 shows the results of the alignment and shrinkage identification for caliper control data. The high resolution caliper profiles and the CalCoil actuator profiles were collected on a soft nip calender at Inland Empire Paper Co., Spokane, Wash. in April 1995. The bump test data were logged during 46 scans including 6 baseline scans and 40 bump response scans. That large number of scans was required since the caliper response develops slowly. In addition to that, the system had a high degree of the MD variability and the process noise. For the results in FIG. 10, the convergence of the algorithm is achieved in 4–8 iterations (30–60 seconds) depending on the initial (manual) alignment error. The alignment computed by the algorithm and shown in FIG. 10 is good despite the fact that CalCoil response is slow, which violates one of the assumptions used in the algorithm design—one of the fast MD dynamics of the response. This illustrates the fact that the developed algorithm is robust enough to be used outside of the initially made assumptions.

Figure 11A:
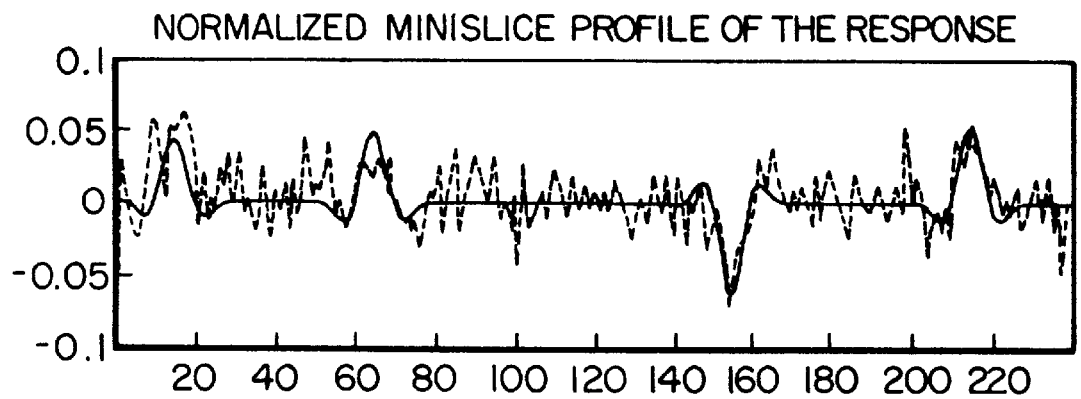
Figure 11B:
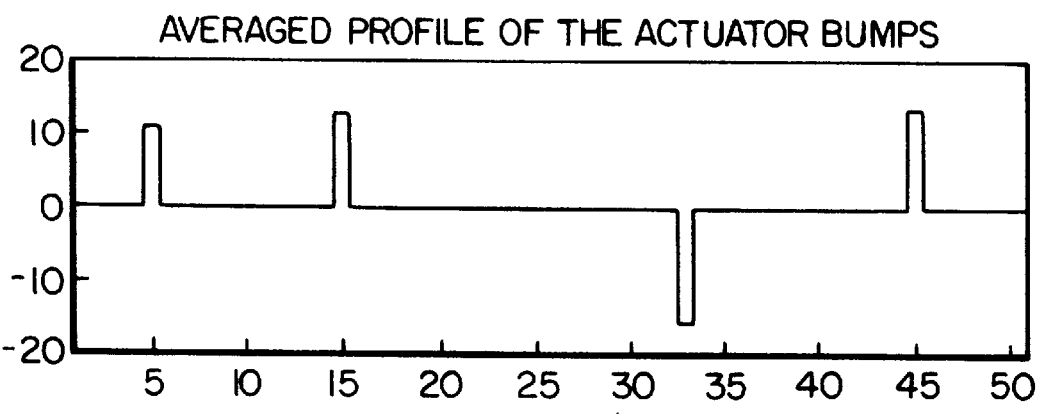

FIG. 11 shows the results of the alignment and shrinkage identification obtained by applying the algorithms described in examples 2 and 3 to another set of real bump test data obtained on the paper mill in Norway, in June 1995. The high resolution dry weight profiles and the AutoSlice actuator moves were logged during the bump test for 40 scans. The level of noise in the system was about twice as high as the amplitude of the obtained bump response. The convergence of the algorithm is achieved in 4–8 iterations depending on the initial alignment error.

Figure 12A:
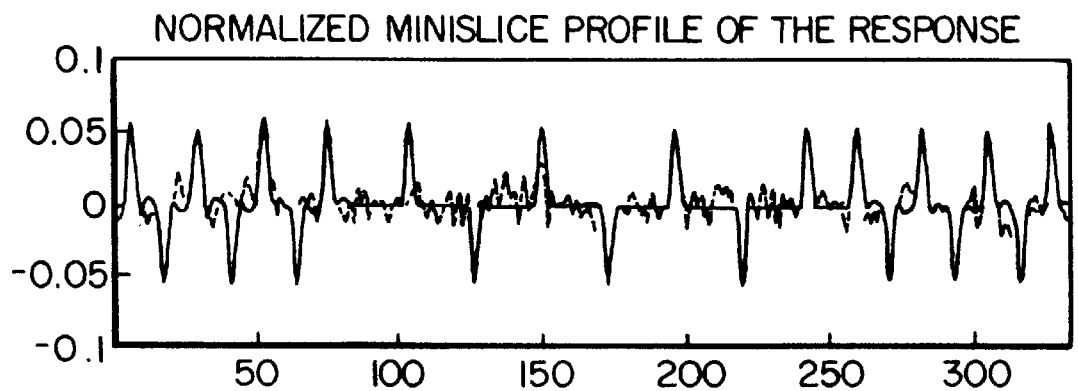
Figure 12B:
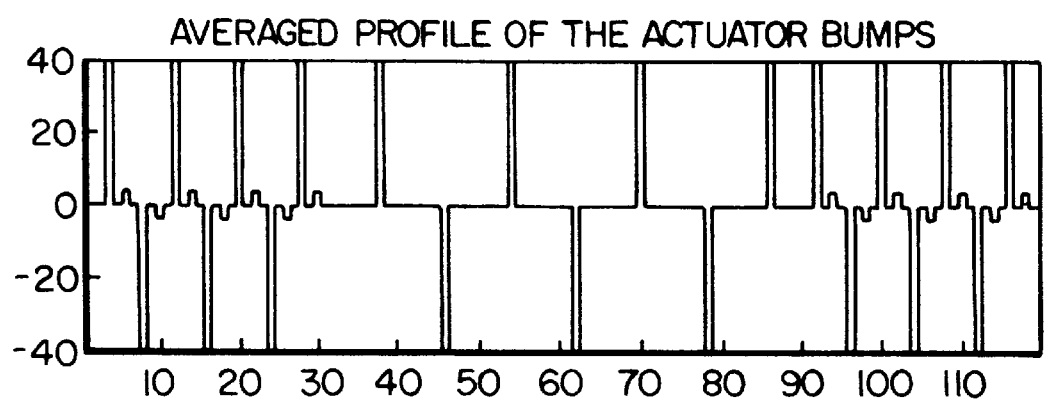

FIG. 12 illustrates the result of nonlinear edge shrinkage identification using the algorithms described in example 4. The data was obtained with an MDI simulator by applying the Walsh function excitation patter shown in FIG. 8 to the actuators. The simulation contained a significant amount of noise: the noise amplitude was taken to be equal to the amplitude of the actuator response to the applied bumps. The high-resolution profiles used in the test were logged for 16 scans together with the actuator moves and then used for the estimation of the shrinkage profile and the alignment parameters. The algorithm took 15 steps (about 10 minutes) to converge.

Figure 13:
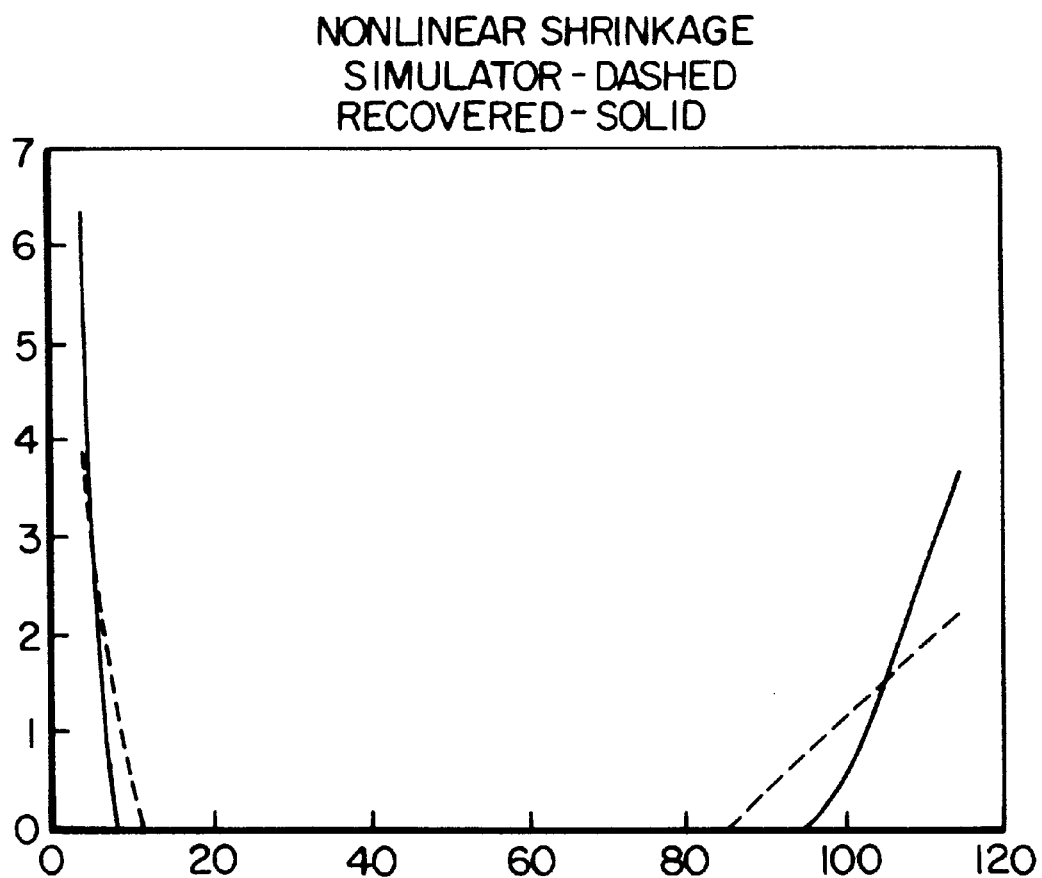
FIG. 13 is a plot of the shrinkage profile used in the process to develop the identification profile of FIG. 12.

The nonlinear shrinkage profile actually used in the simulator is displayed in FIG. 13 along with the nonlinear shrinkage profile identified from the noisy simulation output by the developed software. Due to the measurement noise included in the simulation, the obtained estimate of the shrinkage has a visible error. The magnitude of this error can be appreciated by finding a maximal area between two shrinkage curves which gives us a maximal misalignment of the response centre (an integral of the shrinkage error). This misalignment constitutes less than 0.1 of the minislice width, which is small enough for any practical purposes.

Although the present invention has been described in some detail by way of example for purposes of clarity and understanding, it will be apparent that certain changes and modifications may be practised within the scope of the appended claims.

We claim:

1. A process for determining shrinkage and alignment of the web in a sheetmaking machine having a plurality of actuators for controlling web parameters in the cross-direction comprising the steps of:

applying excitation to the actuator;

collecting data regarding the change in cross-direction web properties due to the excitation of the actuators to determine a measured actuator response profile;

establishing a modeled actuator response profile by
establishing a model fit error array between the modeled actuator response and the measured actuator response; and
minimizing a quadratic loss index of the model fit error array to determine the alignment parameters;

applying a fit of the modeled actuator response profile to the measured actuator response profile; and determining alignment and shrinkage parameters of the web based on the best fit modeled actuator response profile.

2. A process as claimed in claim 1 in which the modeled actuator response profile is formed using a continuous response shape which varies with predetermined parameters.

3. A process as claimed in claim 2 in which the continuous response shape is propagated in the machine direction.

4. A process as claimed in claim 2 in which the continuous response shape has the form:

$$r(x) = \tfrac{1}{2} b(x-d) + \tfrac{1}{2} b(x+d)$$

where d defines the distance between peaks of the response, and b(x) is the defined by the expression $$b(x) = g_0 e^{-ax^2/w^2} \cos \frac{\pi x}{w},$$

where $g_0$ is the response gain (maximal height of the response), w is the response width parameter, and a is the attenuation parameter.

5. A process as claimed in claim 1 in which the step of minimizing the quadratic loss index of the model fit error matrix is achieved using an iterative minimization method and an analytically computed gradient of the loss index.

6. A process as claimed in claim 5 in which the iterative minimization method is the Levenberg-Marquardt method.

7. A method as claimed in claim 5 in which the iterative minimization method is the Newton method.

8. A process as claimed in claim 5 in which applying a fit of the modeled actuator response profile to the measured actuator response profile includes the additional step of using a parametric function defining a shrinkage profile to account for web shrinkage.

9. A process as claimed in claim 8 including a fuzzy logic model of the shrinkage profile in which the profile is defined by the parameters: shrinkage of the two edges of the web, shrinkage in the centre of the web and the two widths of the edge non-linear shrinkage zones.

10. A process as claimed in claim 8 in which the step of applying excitation to the actuators includes applying a dense excitation pattern based on Walsh functions to actuators in the proximity of the edges of the web.

11. A process as claimed in claim 10 in which the excitation pattern includes different and orthogonal Walsh functions applied to one or adjacent actuators.

* * * * *